2,725,402
Patented Nov. 29, 1955

2,725,402

SELECTIVE REDUCTION OF CHLOROBROMO-PHENOLS

Edgar C. Britton and Theodore R. Keil, Mildand, Mich., assignors to The Dow Chemical Company, Midland, Mich., a corporation of Delaware No Drawing. Application December 24, 1951,
Serial No. 263,134

4 Claims. (Cl. 260—623)

This invention relates to a selective and partial dehalogenation of nuclear halogenated phenols and more particularly concerns a method for the preparation of chlorophenols by the selective reduction of halogenated phenols containing both chlorine and bromine atoms as nuclear substituents.

It is known to dehalogenate aromatic halogen-containing compounds by reacting the same with hydrogen in the presence of a catalyst. Busch and Stove (Ber., vol. 49, pages 1063–71, 1916) describe the dehalogenation of tribromophenol and para-chlorophenol by reacting the same with hydrogen in the presence of a hydrogenation catalyst and point out that the halogen is replaced by hydrogen in a quantitative manner.

We have now found that a polyhalophenol having both chlorine and bromine atoms as nuclear substituents can readily be selectively debrominated and reduced so as to obtain a corresponding chlorophenol by reacting the polyhalophenol in liquid medium with hydrogen in the presence of a palladium catalyst and a halogen acid acceptor.

We have discovered that palladium in finely divided form is an unusually effective hydrogenation catalyst for the selective debromination by reduction of a chlorobromophenol. The reduction is almost entirely selective with respect to the bromine atom and the reaction can readily be carried out so as to obtain the corresponding chlorophenol in good yield. The invention permits the production of a chlorophenol having one or more chlorine atoms attached to the aromatic nucleus in a predetermined position, e. g. the preparation of 2,6-dichlorophenol, by a simple and economical process.

The reactants, i. e. the hydrogen and the polyhalophenol containing both chlorine and bromine atoms as nuclear substituents, are employed in amounts corresponding to approximately one mole of the hydrogen per chemical equivalent proportion of bromine in the polyhalophenol. Greater or lesser proportions of the hydrogen may be used, but are less satisfactory, since greater proportions of the hydrogen may result in complete dehalogenation of the polyhalophenol, while lesser amounts of hydrogen are insufficient for selective removal of all of the bromine.

The reaction is carried out in an inert liquid medium, preferably an inert organic liquid which is a solvent for the polyhalophenol and in the presence of a halogen acid acceptor, i. e., a neutralizing or immobilizing agent which reacts with, or absorbs the hydrogen halide formed in the reaction. Examples of suitable liquids are benzene, cyclohexane, toluene, xylene, ethylbenzene and saturated lower aliphatic alcohols such as methyl alcohol, ethyl alcohol, or isopropyl alcohol. Mixtures of any two or more of such compounds may also be used. The halogen acid acceptor is preferably an alkali metal base or a salt thereof, which compound reacts with or absorbs the hydrogen bromide formed in the reaction and immobilizes or removes the halogen acid from the reaction, but does not react with the halophenols to form salts which are insoluble in the reaction medium. Examples of suitable halogen acid acceptors are sodium hydroxide, potassium hydroxide, sodium acetate and potassium propionate. The halogen acid acceptor is usually employed in amount corresponding to the chemical equivalent of the hydrogen bromide theoretically obtainable in the reaction, although somewhat greater amounts may be used. Water may also be employed to absorb and immobilize the halogen acid, particularly when the reaction is carried out in a liquid reaction medium comprising essentially a saturated lower aliphatic alcohol. The water is used in amount such that the reaction mixture is a single phase, suitably in amount corresponding to from 10 to 25 per cent by weight of the alcohol.

Finely divided palladium on charcoal is the preferred catalyst, but palladium in finely divided form and supported on other inert materials such as calcium carbonate, or diatomaceous earth, may also be used. The palladium in concentration of from 5 to 10 percent by weight of the inert supporting material is usually employed in amount corresponding to from 0.01 to 0.1 per cent by weight of the polyhalophenol starting material, although somewhat larger proportions of the catalyst may be used.

The reaction is usually carried out by forming a mixture of the polyhalophenol and the inert reaction medium, e. g. methyl alcohol or cyclohexane, in amount corresponding to from 0.8 to 2.5 parts by weight of the reaction medium per part of the polyhalophenol, and agitating the solution together with the palladium catalyst; a suitable halogen acid acceptor, preferably sodium acetate; and hydrogen in a closed vessel or autoclave at an absolute pressure of from 10 to 100 pounds per square inch and at a reaction temperature between 10° and 80° C., preferably from 25° to 60° C. However, the reaction may be carried out at atmospheric pressure and at the reflux temperature of the reaction mixture. The reaction is discontinued when an amount of the hydrogen corresponding to approximately one mole of the hydrogen per chemical equivalent proportion of bromine in the phenol starting material has been consumed in the reaction. The course of the reaction can readily be followed by the lowering of the hydrogen pressure as the reaction proceeds.

Upon completion of the reduction reaction, the mixture is filtered to remove the catalyst. The chlorophenol product may be recovered in any of several ways. When an alcohol is employed as the reaction medium, the mixture may be diluted with water and the alcohol be distilled directly from the autoclave or other reaction vessel. The residue is extracted with a solvent such as benzene or toluene. The product is recovered from the solvent in any usual way, e. g. by distillation. When an aromatic hydrocarbon such as cyclohexane or toluene is used as the reaction medium, the reaction mixture is filtered to remove insoluble substances and the chlorophenol product is recovered from the filtrate by distillation.

The following examples illustrate ways in which the principle of the invention has been applied, but are not to be construed as limiting the invention:

*Example 1*

A solution consisting of 72.6 grams (0.3 mole) of 4-bromo-2,6-dichlorophenol, and 175 cc. of a mixture of approximately equal parts by volume of benzene and cyclohexane, together with 26.4 grams of anhydrous sodium acetate and 3 grams of a palladium on charcoal hydrogenation catalyst containing 5 per cent by weight of finely divided palladium, was placed in the reaction bottle of a Parr low pressure hydrogenation apparatus. The mixture was maintained at temperatures between 27° and 44° C. and agitated while in contact with hydrogen at pressures of from 17 to 41.5 pounds per square inch, gauge, for a period of 44 minutes. Approximately 0.3 gram mole of hydrogen was consumed in the reaction. The reaction mixture was removed from the bottle and was filtered to remove insoluble substances. The filtrate was washed with water and was fractionally distilled. There was obtained 41.9 grams (0.26 mole) of 2,6-dichlorophenol boiling at 113°–115° C. at 25 millimeters absolute pressure. The product crystallized on cooling to form white crystals melting at 64.2°–66° C. The yield was 85.8 per cent based on the 4-bromo-2,6-dichlorophenol initially used.

*Example 2*

A solution of 60.5 grams (0.25 mole) of 4-bromo-2,6-dichlorophenol, 100 cc. of methyl alcohol and 25 cc. of water, together with 3 grams of a 5 weight per cent palladium on charcoal hydrogenation catalyst, was placed in a glass reaction flask equipped with a reflux condenser and stirrer. The mixture was stirred and maintained in contact with hydrogen by bubbling the same through the solution. The reaction began at once. The temperature of the reaction mixture increased from 27° to 51° C. over a period of 38 minutes and remained at the latter temperature over a total reaction time of 2.25 hours. The solution was filtered to remove the catalyst. The filtrate was a clear yellow solution. It was distilled to separate the methanol. The residue was extracted with benzene. The benzene solution was distilled. There was obtained 33 grams (0.20 mole) of 2,6-dichlorophenol. The yield was 81 per cent.

*Example 3*

A mixture consisting of 103.7 grams (0.5 mole) of 2-bromo-4-chlorophenol, 100 cc. of methyl alcohol, 41.0 grams (0.5 mole) of anhydrous sodium acetate and 3 grams of 5 weight per cent palladium on charcoal hydrogenation catalyst was placed in the reaction bottle of a Parr hydrogenation apparatus. The mixture was agitated and maintained at temperatures between 30° and 45° C. in contact with hydrogen at from 4 to 41 pounds per square inch gauge pressure, over a period of 44 minutes. Approximately 0.5 gram mole of hydrogen was absorbed in the reaction. The mixture was removed from the bottle and was filtered to remove the catalyst. The filtrate was distilled to separate the methyl alcohol. The residue was diluted with 25 cc. of water and was extracted with benzene. The aqueous and organic layers were separated. The organic layer was distilled. There was separated 54 grams (0.42 mole) of 4-chlorophenol boiling at 113°–116° C. at 25 millimeters absolute pressure. The product had a freezing point of 37° C. The yield was 84 per cent.

*Example 4*

A charge of 400 grams of a mixture of approximately equal parts by weight of 2-bromo-4,5,6-trichlorophenol and 2-bromo-3,4,6-trichlorophenol was dissolved in 800 cc. of a mixture of equal parts by volume of benzene and cyclohexane. The solution, together with 121.5 grams of anhydrous sodium acetate and 15 grams of a palladium on charcoal hydrogenation catalyst containing 5 per cent by weight of finely divided palladium was placed in a stainless steel autoclave. The mixture was agitated at room temperature while in contact with hydrogen at pressures between 100 and 200 pounds per square inch gauge pressure for a time of 12 hours. The reaction mixture was removed from the autoclave, heated on a steam bath and filtered while hot to remove the catalyst. The residue was washed with 750 cc. of a heated mixture of equal parts by volume of benzene and cyclohexane. The filtrate was distilled to remove the solvent. There was obtained 268.5 grams of residue. It was a mixture of approximately equal parts by weight of 2,3,4-trichlorophenol and 2,4,5-trichlorophenol. The catalyst residue was extracted with water and the aqueous solution titrated for chloride and bromide. The bromine was selectively removed from the starting materials in quantitative yield. No chloride was found in the aqueous solution.

*Example 5*

A charge of 56.7 grams (0.2 mole) of 4-bromo-2-chloro-6-phenylphenol, together with 16.5 grams of anhydrous sodium acetate, 4 grams of a 5 weight per cent palladium on charcoal hydrogenation catalyst, 75 cc. of benzene and 75 cc. of cyclohexane, was placed in a glass reaction bottle of a Parr hydrogenation apparatus. The mixture was agitated and maintained at temperatures between 30° and 50° C. in contact with hydrogen at 28 to 38 pounds per square inch gauge pressure over a reaction period of 6.5 hours. Approximately 0.2 gram mole of hydrogen was consumed in the reaction. The mixture was removed from the bottle and was filtered to remove the catalyst. The filtrate was washed with water. The organic layer was separated and was distilled. There was obtained 39 grams (0.19 mole) of 6-chloro-2-phenylphenol as white crystals melting at 73.6°–74.4° C. The yield was 95 per cent, based on the 4-bromo-2-chloro-6-phenylphenol initially used.

*Example 6*

A charge of 66.5 grams (0.3 mole) of 4-bromo-6-chloro-ortho-cresol, together with 24.6 grams of anhydrous sodium acetate, 2 grams of a 5 weight per cent palladium on charcoal hydrogenation catalyst, 70 cc. of benzene and 70 cc. of cyclohexane, was placed in a glass reaction bottle of a Parr hydrogenation apparatus. The mixture was agitated and maintained at temperatures between 20° and 30° C. in contact with hydrogen at 14 to 38 pounds per square inch gauge pressure over a reaction period of one hour. Approximately 0.3 gram mole of hydrogen was consumed in the reaction. The mixture was removed from the bottle and was filtered to remove the catalyst. The filtrate was washed with water. The organic layer was separated and was distilled. There was obtained 36 grams of 6-chloro-ortho-cresol boiling at 80°–81° C. at 20 millimeters absolute pressure. The yield was 84 per cent, based on the 4-bromo-6-chloro-ortho-cresol initially used.

Other modes of applying the principle of the invention may be employed instead of those explained, change being made as regards the method herein employed, provided the step or steps stated in any of the following claims or the equivalent of such stated step or steps be employed.

We claim:

1. A method of making 2,6-dichlorophenol which consists in reacting 4-bromo-2,6-dichlorophenol with approximately one molecular equivalent of hydrogen per bromine atom in the molecule in the presence of a palladium catalyst and a halogen acid acceptor while the 4-bromo-2,6-dichlorophenol is dissolved in a liquid reaction medium.

2. A method of making 2,6-dichlorophenol as described in claim 1 wherein, the liquid reaction medium is comprised essentially of a saturated lower aliphatic alcohol and from 10 to 25 per cent by weight of water.

3. A method of making 2,6-dichlorophenol as described in claim 1 wherein, the liquid reaction medium is an aromatic hydrocarbon and the halogen acid acceptor is sodium acetate.

4. A method of making 2,6-dichlorophenol which consists in reacting 4-bromo-2,6-dichlorophenol with approximately one molecular equivalent of hydrogen per bromine atom in the molecule in the presence of a palladium on charcoal hydrogenation catalyst while the 4-bromo-2,6-dichlorophenol is dissolved in a dilute alcoholic solution of sodium hydroxide and thereafter separating 2,6-dichlorophenol from the liquid.

References Cited in the file of this patent

UNITED STATES PATENTS

| | | |
|---|---|---|
| 2,025,032 | Arnold et al. | Dec. 24, 1935 |
| 2,560,950 | Head | July 17, 1951 |

OTHER REFERENCES

Busch et al.: "Ber. der deut. chem. Gesell.," vol. 62B, pp. 2612–20 (1929).